United States Patent Office 3,197,529
Patented July 27, 1965

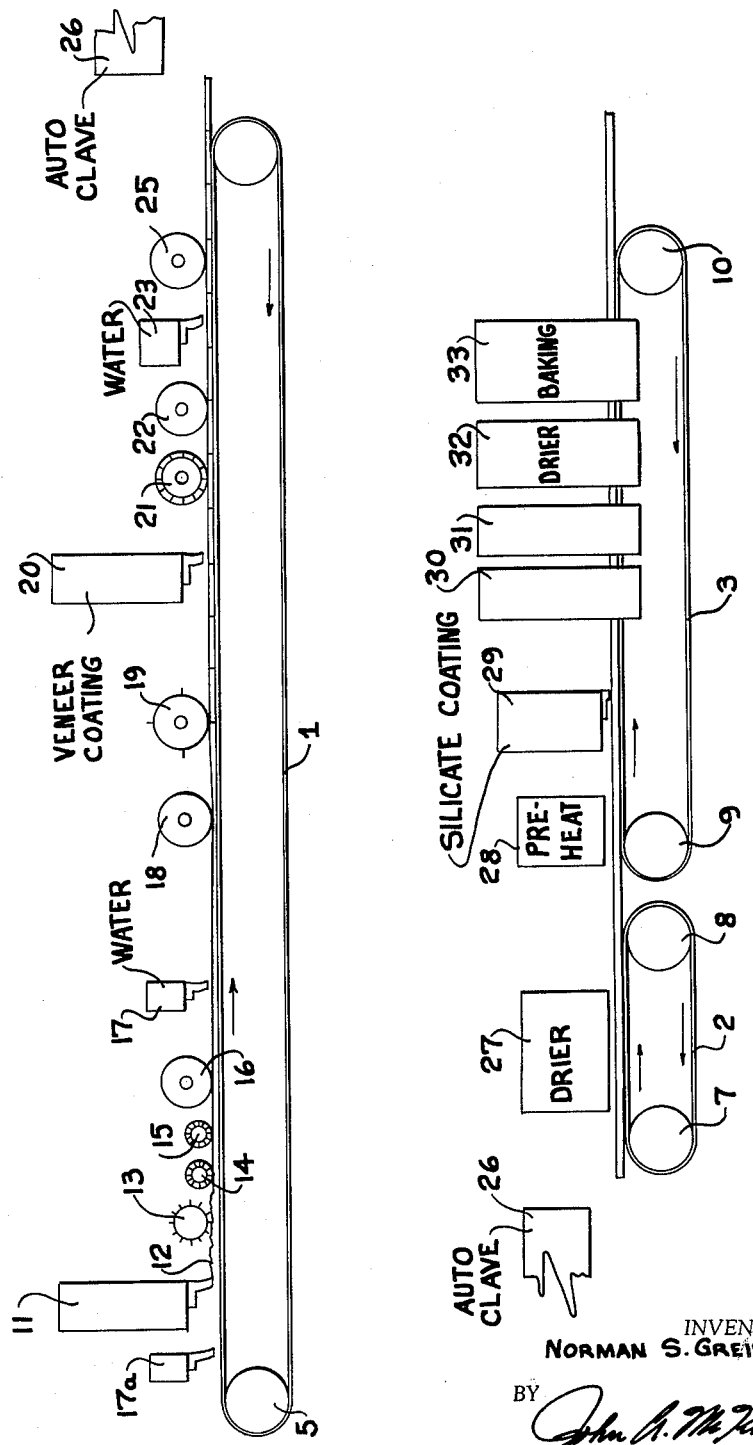

3,197,529
ASBESTOS-CEMENT SHEETS
Norman S. Greiner, Somerville, N.J., assignor to Johns-Manville Corporation, New York, N.Y., a corporation of New York
Filed July 26, 1962, Ser. No. 212,638
8 Claims. (Cl. 264—62)

This is a continuation-in-part of application for Letters Patent Serial No. 830,302 entitled Asbestos Cement Shingles, filed July 29, 1959, in the name of Norman S. Greiner, now abandoned.

This invention relates to asbestos-cement products; more particularly, it relates to a process of fabricating asbestos-cement products having thereon a factory applied coating, as, for example, a ceramic glaze or a silicate composition.

Asbestos-cement sheets or shingles, to date, have been made according to either the "Hatschek" process, also known as the "wet process," or the "Norton" process, also referred to as the "dry process." The two types of processes are primarily different in the manner of the application of water to the dry ingredients of the shingles. The "wet process" is quite similar to a paper making process in that the dry ingredients are mixed in water and then deposited in a wet condition on a moving felt or conveyor belt for dewatering and pressing. For the purposes of this invention, asbestos-cement products produced by a filtration mold process may be considered as having been made by a "wet process" since the dry ingredients in the filtration mold process are mixed in water to form a slurry, which is then pressed and dewatered. On the other hand, in the "dry process," a dry, or relatively dry, mixture of ingredients is deposited as a furnish on a conveyor belt, and water in an amount necessary for hydration of the cement in the furnish is subsequently added. The over-all process, as described herein, of manufacturing and coating asbestos-cement products is particularly related to the "dry process," although the novel coating steps may be practiced on products manufactured by either the dry or wet process. While asbestos-cement sheet products such as asbestos-cement, shingles, boards, and the like articles may be coated according to the present invention, the term "asbestos-cement shingle" or "shingle" will be used hereinafter to include all such sheet products.

Ceramic glaze or silicate coatings on "wet process" asbestos-cement shingles are well known in the art. However, the techniques used in applying such a silicate coating on a "wet process" shingle are not necessarily adaptable to commercially successful application of a similar ceramic glaze or silicate coating on "dry process" shingles because of the basic differences in the two types of shingles.

The application of such coatings to asbestos-cement shingles fabricated by the conventional "dry process," using "wet process" coating techniques, produces shingles having a "mottled" surface effect. This effect reveals itself as light and dark tones of the particular coating, i.e., a non-uniform coating of varying shades of a particular coating color.

In addition, where high temperatures are used to bake the coating, blowouts and spalling often occur in the faces of the "dry process" shingles during such baking.

Another obstacle encountered during the manufacture of coated "dry process" shingles is the occurrence of veneer splits after baking, evidenced by the separation of the added veneer, where employed, from the base shingle at certain areas of the shingle surface.

Still another problem associated with the application of ceramic glaze or silicate coatings to "dry process" shingles using "wet process" coating techniques is that pin-point blistering often occurs in the coated surface. This is evidenced by a plurality of visible pin-points or pin-pricks on the shingle surface after it has been baked.

It must be noted that by using the "wet process" techniques in applying such painted coatings or glazes on "dry process" shingles, a small percentage of properly coated shingles can be produced. However, the percentage of rejects, due to the various defects produced, as noted heretofore, runs so high that the commercial manufacture of coated "dry process" shingles in this manner would be economically unfeasible because the costs would be prohibitive. Furthermore, blistering and mottling of the coating often occur in "wet process" shingles when exposed to high baking temperatures.

Accordingly, an object of this invention is to provide a commercially successful process for producing an asbestos-cement shingle, manufactured by the "dry process," with a baked silicate or ceramic coating thereon.

Another object of this invention is to provide a process for producing an asbestos-cement shingle with a baked silicate coating thereon wherein mottling, blistering, veneer splits, and blowouts or spalling of the shingle during the baking cycle do not occur.

In brief, the invention involves a novel process for coating asbestos-cement products with a silicate composition. The basic steps of the process are (1) drying the products until their moisture content, by weight, does not exceed about 2%, (2) applying a silicate coating while maintaining the temperature of the products in the range of about 90° F. to about 150° F., and baking the coating. To prevent blowouts and spalling during the baking operation of products manufactured by the "dry process," such products are formed with about 10%–30% more water than the amount theoretically necessary to effect complete hydration of the cement in the asbestos-cement composition.

The nature of the invention will be more fully understood and other objects may become apparent, when the following detailed description is considered in connection with the accompanying drawing, wherein:

The single figure represents diagrammatically the apparatus used in the process of the present invention.

The apparatus, per se, used in formulating and fabricating the basic shingles of the present invention is that found, for the most part, in conventional "dry process" equipment, as illustrated for example in United States Patent No. 2,230,880 of George B. Brown, issued on February 4, 1941. Referring to the single figure of the drawing, the apparatus comprises a plurality of conveyor belts 1, 2, 3 rotated by conventional pulleys or drums 5 and 6, 7 and 8, and 9 and 10 respectively, with each belt being driven in the direction indicated by the arrows at a particular speed according to a predetermined shingle timing schedule.

A mixing box or "fluff box" 11 deposits a proper dry or partially wet mixture to comprise a furnish 12 on the belt 1 according to a predetermined formula and following a predetermined rate of feed. Picker roll 13 evenly distributes the furnish 12 on the surface of the belt 1, and the continuous layer 12 is compressed by perforated, hollow rolls 14, 15 whereby the air within the furnish is removed. Press roll 16 flattens the furnish or uncured sheet to a relatively thin layer, and water is deposited from container 17 on the passing compressed layer. Water also is usually deposited on the belt before the laying of the mixture from the "fluff box," as from a water container 17a, so that the water for hydration enters from both surfaces of the shingle; the initial water added also assists to prevent sticking of the furnish to the belt. In some "dry process" installations, as indicated above, a small percentage of the total water required is added in the "fluff box" 11, or prior to the entrance of the ingredients into the "fluff box"; however, the process is still considered a "dry process" since this amount of added water is relatively small as compared to the large amount used in the "wet process" in the initial stages. This small amount of water added is usually only sufficient to moisten the dry ingredients slightly; at most, the materials in the "fluff box" 11 become slightly damp. Press roll 18 subsequently compresses slightly the continuous layer and, at the same time, distributes the water throughout the shingle base. The layer is then cut into the desired shingle or sheet size by cutter roll 19.

A veneer coating, if desired, is added to the cut shingles from "fluff box" 20, and the veneer and base are subsequently treated by the perforated press roll 21 and plain press or embossing roll 22. Additional water is deposited from container 23, and the mixture is compressed into its final form by the grain or press roll 25. The "green" or uncured shingles are conventionally steam cured in autoclave 26, and are then transferred to the coating, drying, and baking apparatus for further finishing and treatment. The shingles are conveyed on conveyor 2 through a pre-drier 27, and in some cases, as will be explained more fully hereinafter, the shingles are stockpiled and then introduced into pre-heating apparatus 28 adjacent conveyor 3. After this pre-treatment of the shingles, the silicate coating is applied by apparatus 29, then dried by driers 30, 31, and 32 and subsequently baked by the baking oven 33. After cooling, the coated shingles are ready for application to a building surface.

The apparatus, per se, concentrated about belt 1, is of a type commonly found in machines following exclusively the "dry process"; however, as described hereinafter, several of the steps of the proportions of ingredients used are at a sharp variance from common practices.

On the conventional side of the process, the mixtures deposited from fluff box 11 are well known. The basic ingredients of hydraulic cement, e.g., Portland cement, asbestos fiber or shingle scrap, and silica may be proportioned in various percentages. A typical formula for the base shingle is as follows; the percentage of the ingredients being based upon the dry weight of the mix:

|  | Percent |
| --- | --- |
| Asbestos fiber | 19 |
| Hydraulic cement | 30 |
| Silex (quartz) | 19 |
| Shingle scrap | 32 |

The veneer applied has basically the same ingredients as the base mix, with the exception of the shingle scrap, which is eliminated, and the percentages of these ingredients in the veneer may also be altered within relatively wide limits, as is well known. A typical formulation for the veneer can be as follows, the percentage of the ingredients being based upon the dry weight of the mix:

|  | Percent |
| --- | --- |
| Asbestos fiber | 7 |
| Hydraulic cement | 26 |
| Silex (quartz) | 21 |
| Whiting (calcium carbonate) | 39 |
| Sand | 7 |

Picker roll 13, perforated press rolls 14, 15, 21, cutter roll 19, and press rolls 16 and 18, are operated in the conventional manner, and the press rolls are maintained at their usual light pressures (approximately 200 lbs./lin. inch).

With respect to the variances from conventional processes necessary to adapt the "dry process" to high production application of a silicate coating or ceramic glaze, the amount of water added from containers 17 and 17a in the conventional commercial process is, theoretically, sufficient to effect complete hydration of the cement in the shingle base; this theoretical percentage varies from 8–10%, approximately, by weight of the wet shingle. However, the water added does not usually exceed 9%, as increases in the water percentages also increase the danger of the uncured shingles adhering to the grain roll 25, which is ordinarily maintained at a pressure of approximately 4,000–5,000 lbs./lin. inch. In standard asbestos-cement shingles if complete hydration is not obtained, no visible harmful effects are ordinarily produced. Additional hydration is always produced by the action of the steam in the autoclave 26, so that the amount of cement not hydrated is usually quite insignificant, and, in any event, produces no harmful effects in the final standard shingle product. In the instant process of baking the silicate coating, very high ultimate temperatures are attained (approximately 525° F.–600° F.) to increase the speed of the baking cycle and to insolubilize the coating on the shingle surface. Consequently, in view of such high temperatures, any minute concentrations of unhydrated cement within the shingle create "blowouts" in or spalling of the rear face of the shingle, i.e., the uncoated side. Thus, the hydration factor becomes very critical in the instant process, and complete hydration of the cement must be effected to insure a satisfactory product. The problem of preventing blowouts and spalling generally is not encountered in the coating of "wet process" shingles with a silicate composition.

Using the apparatus described, this complete hydration is produced by depositing an amount of water from containers 17 and 17a exceeding the theoretical amount necessary for complete hydration of the cement in the shingle base by approximately 10–30%. The actual water percentages utilized preferably vary approximately from 10–13.5% by weight of the wet base shingle.

However, these relatively high percentages of water added create sticking problems at grain roll 25. To eliminate this adhering of the roll and shingle, the roll pressure must be reduced by approximately 50%; simultaneously, the speed of belt 1 must also be reduced by approximately 40%.

A method of increasing the water content of asbestos-cement shingles during formation in a "dry process" fabricating machine to effect complete hydration of the cement is that disclosed in United States Patent No. 2,859,484, of Clayton V. French and Elmer R. Ihne, issued on November 11, 1958, and assigned to the assignee of the instant invention. In this method, the water content may be increased to about 20% by weight above the theoretical amount necessary for complete hydration without substantially decreasing production line speeds; this relatively great increase of water in a "dry process" is accomplished by utilizing a double press roll for the single press roll 25 (i.e., a pair of press rolls acting sequentially on the sheet in place of the single press roll 25) and maintaining the respective roll pressures in a definite ratio. As disclosed in this patent, the pressure of the final roll is approximately between 3–15 times greater than the preceding roll, with the pressure of the first roll ranging approximately from 200–2,000 lbs./lin. inch and the pressure of the last press roll or grain roll ranging approximately between 1,500–6,000 lbs./lin. inch.

To take advantage of the teachings of this patent utilizing existing equipment, press or embossing roll 22 is increased in pressure to approximately 500 lbs./lin. inch. This pressure, compared to the grain roll pressure of 2,500 lbs./lin. inch produces a pressure ratio of 5, within the 3–15 range disclosed in the patent. A more satisfactory application of the teachings of the aforementioned patent would be to split the grain roll pressure into two stages, subsequent to the addition of the water at 23. However, this would necessitate a redesign of the tail end of the shingle fabrication apparatus. Utilizing the equipment available, this combination of decreasing the pressure of the grain roll 25, increasing the pressure on the embossing roll 22, and reducing the belt speed to approximately 60 ft./min., with the ratios of grain roll pressure to embossing roll pressure maintained at about the lower limit of press roll pressure ratios as taught by the aforementioned patent, produces satisfactory base sheets for the application of the silicate coating.

If the shingles are coated and baked at the temperatures indicated previously without any further treatment after removal from the autoclave, the coating tends to blister, which is evidenced by a number of pin-point punctures throughout the coating, and which is caused by the presence of excess residual water in the shingles when exposed to the high temperatures of the baking oven. This phenomenon occurs not only in "dry process" shingles but also in "wet process" shingles, although to a somewhat lesser degree in the latter shingles. In order to preclude blistering, it has been determined that the moisture content, by weight, of the shingles at the time of coating and baking should not exceed about 2% and preferably may be about 0.5%.

After the shingles are steam cured in the autoclave 26, their moisture content ranges from about 5% to about 7%, although the shingle surfaces are dry to the touch and no moisture is visible. The temperature-pressure conditions in the autoclave may vary, but as an example of such conditions, shingles may be autoclaved for 6 hours at about 340° F. and 100 p.s.i. The moisture content of steam cured shingles is less than that of normal cured shingles, the moisture content of which may range from about 10% to about 12%, which is a sufficient amount to be observed and felt on the shingle surface.

To reduce the moisture content to a maximum of 2%, various conditions may exist in the drier 27; but for an economical operation from the standpoint of time and temperature, the shingles may be dried for a period of 12 hours at an air temperature of 350° F., under which conditions the temperature of the shingles will vary from about 250° F. to about 325° F., depending upon the location of the shingle in the drier.

It has been found that unless the temperature of either "wet process" or "dry process" shingles is at least about 90° F. at the time of coating, the subsequently dried and baked coating presents a mottled appearance which is evidenced by light and dark tones of the particular coating color. It is believed that this mottled effect is caused by variable absorption of the silicate coating due to variable shingle density. Thus, an area of relatively low density absorbs more coating composition than an area of relatively high density, causing a lighter tone in the former area than in the latter area. When the shingle temperature is about 90° F. or more, the subsequently applied coating "freezes" on the shingle surface to prevent any varying degrees of absorption. During "freezing" of the coating, a rapid evaporation of moisture takes place, forming a relatively dry coating or "skin" on the shingle surface. Temperatures greater than 90° F. produce a greater "freezing" effect, but increased temperatures accelerate this effect to such an extent that there is a tendency toward the creation of large blisters. It has been found that the maximum temperature of the shingles during coating should not exceed about 150° F., while the preferred temperature range is from about 90° to about 110° F.

As previously stated, it may or may not be necessary to pre-heat the shingles after the drying operation, depending upon the time interval between the drying step and the coating step. If the shingles are stockpiled after the drying operation in drier 27 to await the coating and baking steps at a later time, the temperature of the shingles will fall and eventually reach room temperature (about 75°), necessitating a pre-heating operation to raise the temperature back to the minimum temperature of 90° F. If a more uninterrupted process is desired, the shingles may be allowed to cool down to the required temperature range, after which they may be coated and baked; or they may be heated slightly after such cooling to maintain their temperature within the required range for a longer period of time.

With the pre-drying and pre-heat treatments applied to the shingle, surprisingly, a single spray or coating of the ceramic glaze was found to be sufficient to produce a high grade finish, as contrasted with multiple-coat applications often found to be necessary in prior processes.

The ceramic composition added as the coating to the shingles basically is well known and is disclosed, for example, in United States Patents No. 2,372,285, issued to H. M. Marc and H. W. Greider, on March 27, 1945, No. 2,372,284, issued to H. M. Marc on March 27, 1945, and No. 2,350,030, issued to H. W. Greider on May 30, 1944.

Patent No. 2,350,030 discloses the use of coating compositions for asbestos-cement shingles of acidic kaolinitic clays in combination with a pigment and sodium silicate. The sodium silicate in the dry coating composition may vary between 30–70% by weight; the acidic kaolinitic clays may vary between 10–50% by weight of the dry solids; and the pigment may vary between 10–30% by weight of the dry solids. Special advantages accrue when a reactive metal oxide is substituted for a portion of the pigment; preferably, zinc oxide is used, as it also has a pigmenting effect. The metal oxide added should not be used in a greater amount than that which will react with 50% or less of the soluble silicate in the coating. The temperature at which the coating, applied as an aqueous emulsion, is baked to insolubilize the coating may vary between approximately 500° F.–750° F.

Patent No. 2,372,284 teaches the use of potassium silicate as a substitute for sodium silicate; its chief advantage being that much lower temperatures may be utilized to produce an effective insolubilized coating. In addition, mixtures of potassium silicate and sodium silicate as the soluble silicate constituent of the coating composition are particularly effective in view of the lower baking temperatures which may be utilized (350° F.–650° F.) and also in view of the fact that the mixtures produce a somewhat more weather resistant coating. Preferably, the soluble silicate mixture is predominately potassium silicate.

Patent No. 2,372,285 teaches the use of the coating compositions, noted in the two patents previously described, in a plurality of layers.

These coating compositions, used according to the precepts of the patents noted, which provide the basic teachings, are not, however, sufficient to produce satisfactory ceramic veneers on "dry process" shingles manufactured on a commercial scale. For example, when such coatings were applied to "dry process" shingles and subjected to ultimate baking temperatures between 500° F. and 600° F., a certain percentage of the shingles, fabricated in this manner, were rejected because of veneer splits. The higher the temperature utilized, the greater was the number of shingles which had to be rejected because of such veneer splitting. It was discovered that substitution of diatomaceous earth for a portion of the clay eliminated such veneer splitting completely. The particular diatomaceous earth used was a flux-calcined diatomaceous earth manufactured and marketed under the Johns-Manville Corporation's trademark "Celite 281." A typical chemical analysis of "Celite" diatomaceous earth is as follows:

| | Percent by weight |
|---|---|
| Loss on ignition | 3.0 |
| $SiO_2$ | 89.4 |
| $Al_2O_3$ | 4.1 |
| $Fe_2O_3$ | 1.5 |
| $T_1O_2$ | 0.1 |
| CaO | 0.2 |
| MgO | 0.7 |
| $Na_2O(+K_2O)$ | 0.8 |
| Total | 99.8 |

It is believed that the porous characteristics of the diatomaceous earth assist in making the coating sufficiently porous whereby the moisture within the coating is permitted to escape during drying and baking, thus eliminating the veneer splitting noted.

The clay, which is ordinarily of the kaolin type, is preferably used in amounts of approximately 8–10% by total weight of the dry and liquid ingredients but excluding the sodium metasilicate, the addition of which is noted hereinafter. Substitution of the diatomaceous earth for approximately 50% of the kaolin clay, by weight, was sufficient to eliminate completely the veneer splitting defection; however, the use of the diatomaceous earth in excess of approximately 50% tended to produce a "flatter" finish.

In a typical formulation of the coating, the percentages of the various ingredients, by weight, were as follows:

| | Percent |
|---|---|
| Aqueous potassium silicate solution (27.3% solids) | 58.2 |
| Aqueous sodium silicate solution (37.6% solids) | 14.7 |
| Zinc oxide | 5.7 |
| Diatomaceous earth | 4.9 |
| Kaolin clay | 4.9 |
| Pigment | 11.6 |

On a dry weight basis, i.e., excluding the water used in the aqueous alkali metallic solutions, which water is evaporated from the coating upon drying and baking, the percentages of the ingredients were as follows:

| | Percent |
|---|---|
| Potassium silicate | 32.8 |
| Sodium silicate | 10.3 |
| Zinc oxide | 11.8 |
| Diatomaceous earth | 10.1 |
| Kaolin clay | 10.1 |
| Pigment | 24.0 |

With another coating, wherein the diatomaceous earth was substituted for a portion of the kaolinitic clay, approximately 10% of the shingles produced had veneer splits as contrasted with 90% veneer splitting on shingles having approximately the same coating formula but wherein kaolinitic clay was used to the exclusion of the diatomaceous earth. The coating formula used which exhibited only 10% veneer splits was as follows:

| | Percent |
|---|---|
| Aqueous potassium silicate solution | 61.0 |
| Aqueous sodium silicate solution | 15.1 |
| Zinc oxide | 5.9 |
| Diatomaceous earth | 5.0 |
| Kaolinitic clay | 5.0 |
| Pigment | 9.0 |

On a dry weight basis, the coating formula is as follows:

| | Percent |
|---|---|
| Potassium silicate | 35.3 |
| Sodium silicate | 12.0 |
| Zinc oxide | 12.5 |
| Diatomaceous earth | 10.6 |
| Kaolinitic clay | 10.6 |
| Pigment | 19.0 |

The coating mixture, wherein the rate of veneer splitting was approximately 90%, was as follows:

| | Percent |
|---|---|
| Aqueous potassium silicate solution | 61.0 |
| Aqueous sodium silicate solution | 15.1 |
| Zinc oxide | 5.9 |
| Kaolinitic clay | 9.0 |
| Pigment | 9.0 |

On a solids basis, the formula was as follows:

| | Percent |
|---|---|
| Potassium silicate | 36.0 |
| Sodium silicate | 12.3 |
| Zinc oxide | 12.8 |
| Kaolinitic clay | 19.4 |
| Pigment | 19.4 |

The relative percentages of clay and diatomaceous earth may vary depending upon the type of finish desired to be produced and the relative degree of porosity desired to be imparted. However, it is believed that approximately 20% substitution of the kaolinitic clay by the diatomaceous earth is necessary to produce effective results; on on the other hand, over approximately 60% substitution does not produce any additional advantages. As noted by the patents previously briefly described, the range of clay is approximately 10–50%, preferably 20–40%, by weight on a solids basis. Substitution of 20–60% of the clay by the diatomaceous earth, depending upon the clay content and the coating formula used, and preferably maintaining the diatomaceous earth at a minimum of at minimum of approximately 5% by weight of the solids, are effective in eliminating or markedly reducing the percentage of shingles having veneer splitting. As noted, substitution of greater amounts of diatomaceous earth than approximately 60% of the clay, do not produce any additional effect as regards the veneer splitting defection; on the other hand, substitutions of more than 60% tend to produce a "flatter" finish.

Once the causes of this type of failure and a solution to eliminate this failure are known from an examination of this disclosure, it is evident that other substitutes will perform equally as well as the flux-calcined diatomaceous earth specifically recited herein. Thus, other finely divided porous or absorptive mineral fillers such as, for example, unexfoliated perlite and calcium silicates, in approximately the ranges recited, will assist greatly in the elimination of veneer splitting.

Still another problem associated with the application of ceramic type coatings to "dry process" shingles was the occurrence of fine or small blisters in the baked coated surface. It was ascertained that such blisters were the result of "skinning" over of the coating surface during drying and baking. Such microfine blisters were eliminated by the addition of small amounts of sodium metasilicate ($Na_2SiO_3 \cdot 5H_2O$) added to the typical coating mixture, recited heretofore, before application by dissolving the sodium metasilicate in an equal weight of warm water. It is believed that this agent tends to reduce the surface tension of the water contained in the coating, thereby permitting the more rapid evaporation of the water during early drying stages. Concentrations of 1½–3% of the dry sodium metasilicate (by weight of the liquid silicates) produced a significant decrease in the occurrence of the microfine blisters. With concentrations of the dry sodium metasilicates in amounts between 4 and 7% by weight of the liquid silicates in the typical formulation recited, the elimination of the blisters also improved, but there was a noticeable decrease in the degree of coating insolubility, after baking. Consequently, while the percentage of sodium metasilicate may be as high as 7%, the preferred range is 1½–3%, based on the weight of liquid silicates. On a basis relative to the potassium silicate and/or sodium silicate solids, the sodium metasilicate may vary between approximately 5–24%, with the preferred range being approximately 5–10%. This relationship holds true for other ratios of potassium silicate and/or sodium silicate solids relative to the total dry solids. Thus, the patents, previously enumerated, disclosed that the potassium silicate and/or sodium silicate, including mixtures thereof, may vary between 30–70% by weight of the total dry solids. The sodium metasilicate solids within this range may consequently vary between approximately 5–24% by weight of the potassium silicate and/or sodium silicate solids, with the preferred range being likewise approximately 5–10%.

To speed up the manufacturing line process or to increase the rate of baking the surface coatings on the shingles, high temperatures are maintained during the baking of the coating. These temperatures can only be used to advantage if the moisture within the paint coating is removed; this is done by the infra-red driers 30, 31 and 32. In the present installation, hot air temperatures between 225° F.–275° F. were used in the first drier, and the shingles were maintained in this hot air bath for approximately 3½ minutes. The second dried utilized hot air temperatures between 325° F.–350° F., with the time cycle in this stage being also 3½ minutes. The third drying zone utilized an ambient air temperature between 375° F.–400° F.; the duration of the shingles in this zone was approximately 3¼ minutes. In the baking oven 33, also of the infra-red type, the ambient air temperatures were maintained at approximately 400° F.–425° F., and the passage time for the shingle through the oven was approximately 5 minutes. As disclosed, three distinct drying sections or zones and one baking section or zone were utilized; however, it is evident that since the drying and baking process is continuous, only one large oven is actually used and the temperature of the oven is gradually increased to the baking temperatures brought about by progressively increasing the radiant heat output of the infra-red burners. More important, the effect of the infra-red heating and the heated ambient air is such as to produce a gradual increase in surface temperature of the coated shingle. In the first zone of the drier, for example, the surface temperature is gradually increased from 115° F.–130° F. to approximately 200° F.–240° F.; in the second zone, the temperature of the surface is gradually increased from 220° F.–240° F. to approximately 280° F.–300° F.; in the third zone, the surface temperature is gradually increased from 280° F.–300° F. to approximately 375–400° F. In the baking area of the ovens, the surface temperature is gradually raised from 375° F.–400° F. to 525° F.–600° F. While it is evident that the temperature-time curve may be altered in many respects, as, for example, by increasing the time of passage of the shingle and decreasing the rate of applied heat, it is imperative, or at least highly advantageous, to obtain a gradual heating of the surface of the shingle to prevent any sudden thermal shocks from creating flaws in the coating.

As noted, the use of such high baking temperatures produces peculiar problems, as, for example, blowouts, spalling, and blistering, which are not ordinarily encountered with drying and baking asbestos-cement products at lower temperatures. Although the present invention has been described particularly in connection with asbestos-cement shingles produced by the "dry process," the coating steps are applicable also to "wet process" shingles. Although blistering and mottling of the silicate coatings on "wet process" shingles generally are not as severe as on "dry process" shingles, these problems nevertheless are present and are eliminated by following the coating steps described above.

It should be understood that variations and modifications of the present invention may be made without departing from the spirit of the invention. It also should be understood that the scope of the invention is not to be interpreted as limited to the specific embodiment disclosed herein but only in accordance with the appended claims, when read in the light of the foregoing disclosure.

What I claim is:
1. A process for manufacturing an asbestos-cement sheet comprising the steps of:
  (a) fabricating by a "dry process" an uncured asbestos-cement sheet having a moisture content, by weight, greater than 10%,
  (b) curing said sheet,
  (c) drying said sheet until the moisture content, by weight, does not exceed about 2%,
  (d) applying a silicate coating which comprises at least one silicate compound selected from the group consisting of sodium silicate and potassium silicate to the sheet while the temperature of the sheet is in the range of about 90° F. to about 150° F., and
  (e) baking the coating.
2. A process as recited in claim 1, wherein the sheet is steam cured.
3. A process for manufacturing an asbestos-cement sheet comprising the steps of:
  (a) fabricating by a "dry process" an uncured asbestos-cement sheet having a moisture content, by weight, greater than 10%,
  (b) curing said sheet,
  (c) drying said sheet at a temperature greater than 150° F. until the moisture content, by weight, does not exceed about 2%,
  (d) cooling the sheet to a temperature range of about 90° F. to about 150° F.,
  (e) applying a silicate coating which comprises at least one silicate compound selected from the group consisting of sodium silicate and potassium silicate to the sheet, and
  (f) baking the coating.
4. A process as recited in claim 1, wherein the sheet is steam cured.
5. A process for coating a cured asbestos-cement sheet comprising the steps of:
  (a) drying the sheet until the moisture content thereof, by weight does not exceed about 2%,
  (b) applying a silicate coating which comprises at least one silicate compound selected from the group consisting of sodium silicate and potassium silicate to the sheet while maintaining the temperature of the sheet in the range of about 90° F. to about 150° F., and
  (c) baking the coating to insolubilize soluble silicate therein.
6. A process as recited in claim 5, wherein the temperature of the sheet during baking is in the approximate range of 525° F. to 600° F.
7. A process for coating a cured asbestos-cement sheet comprising the steps of:
  (a) drying the sheet at a temperature greater than 150° F. until the moisture content, by weight, does not exceed about 2%,
  (b) cooling the sheet to a temperature range of about 90° F. to about 150° F.,
  (c) applying a silicate coating which comprises at least one silicate compound selected from the group consisting of sodium silicate and potassium silicate to the sheet, and
  (d) baking the coating.
8. A process as recited in claim 7, wherein the asbestos-cement sheet is one manufactured by the "dry process" with 10%–30% more water present than theoretically necessary to effect complete hydration of the cement therein.

References Cited by the Examiner
UNITED STATES PATENTS

| | | | |
|---|---|---|---|
| 2,350,030 | 5/44 | Greider | 117—126 |
| 2,354,351 | 7/44 | Schultz | 117—126 X |
| 2,372,284 | 3/45 | Marc | 117—126 |
| 2,859,484 | 11/58 | French et al. | 18—60 |

FOREIGN PATENTS 482,307  10/35  Great Britain.

OTHER REFERENCES

Glossary of Geology and Related Sciences, 1957, Library of Congress No. 60–600 83, page 267 relied on.

ROBERT F. WHITE, *Primary Examiner.*

ALEXANDER H. BRODMERKEL, *Examiner.*